D. LAMBERT.
GAS MEASURING AND INDICATING INSTRUMENT.
APPLICATION FILED MAR. 20, 1918.
1,303,073.
Patented May 6, 1919.
2 SHEETS—SHEET 1.
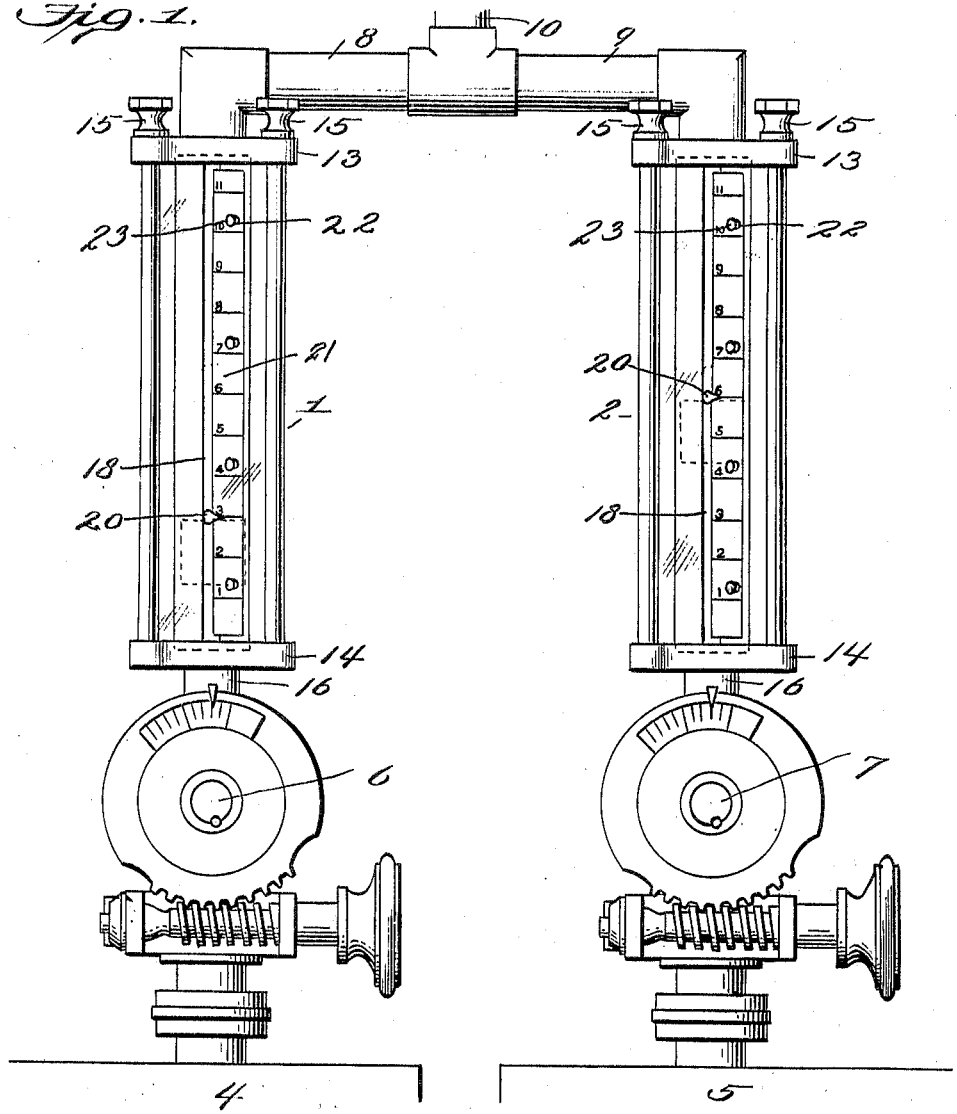
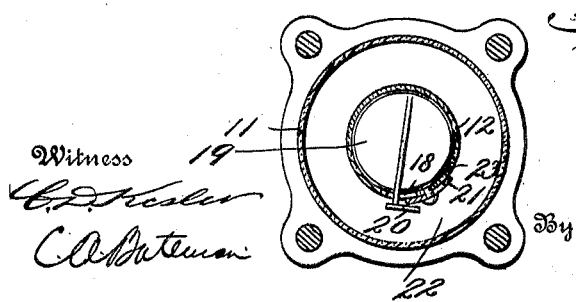

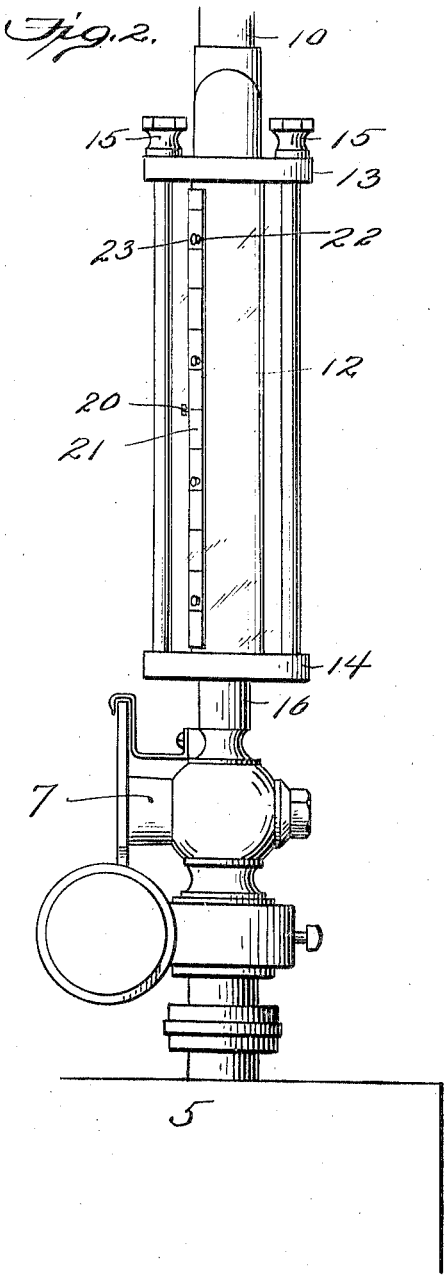
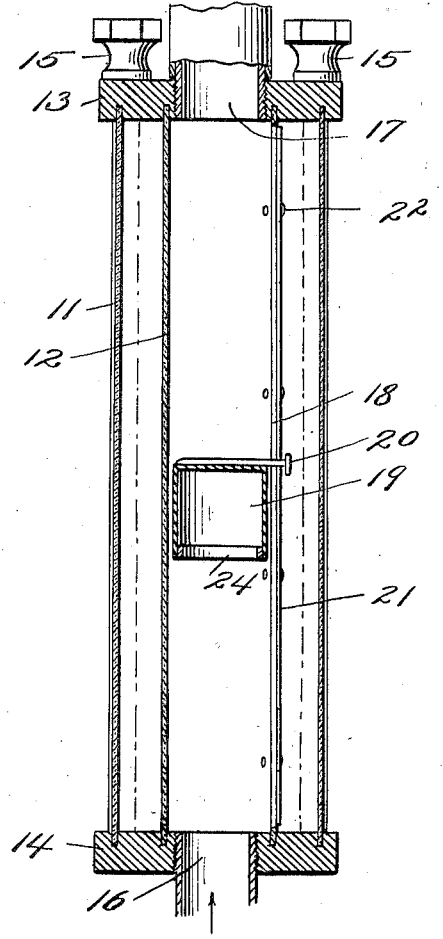

UNITED STATES PATENT OFFICE.

DAVID LAMBERT, OF BROOKLYN, NEW YORK.

GAS MEASURING AND INDICATING INSTRUMENT.

1,303,073. Specification of Letters Patent. Patented May 6, 1919.

Application filed March 20, 1918. Serial No. 223,655.

*To all whom it may concern:*

Be it known that I, DAVID LAMBERT, a citizen of the United States, residing at Brooklyn, in the county of Kings and State of New York, have invented new and useful Improvements in Gas Measuring and Indicating Instruments, of which the following is a specification.

My present invention relates to apparatus for measuring and indicating the rate of flow of gases, and the primary object of the invention is to provide a novel and improved device of this character whereby the rate of flow of a gas at any moment is indicated directly and accurately by a relatively simple, inexpensive and efficient construction. A further object of the invention is to provide a plurality of such devices which are connected and arranged to indicate the respective rates of flow of different gases comprising the constituents of gas mixtures such, for example, as nitrous oxid and oxygen for anesthesia, oxygen and air for resuscitation and similar purposes, acetylene and oxygen for welding and cutting purposes, air and ammonia gases for the manufacture of nitric acid, illuminating gas and air for blow pipes, for the measuring of poisonous gases, and for various other purposes where it is desirable or necessary to determine the rate of flow of gases and to enable gases to be mixed or combined in definite relative proportions.

To these and other ends, the invention consists in certain improvements, and combinations and arrangements of parts, all as will be hereinafter more fully described, the novel features being pointed out particularly in the claims at the end of the specification.

In the accompanying drawings:

Figure 1 is a front elevation of an instrument constructed in accordance with the present invention for measuring and indicating the respective rates of flow of gases forming the constituents of gaseous mixtures.

Fig. 2 represents a side elevation of the instrument as shown in Fig. 1.

Fig. 3 represents on an enlarged scale a section taken vertically through one of the components of the measuring instrument; and Fig. 4 represents a transverse section through one of the components of the measuring instrument.

Similar parts are designated by the same reference characters in the several views.

The present invention provides a relatively simple and inexpensive instrument capable of measuring accurately and indicating correctly at any moment the rate of flow of a gas or gases, it being capable of use generally where it is desirable or necessary to determine the rate of flow of the gas or the respective rates of flow of different gases, some of the uses to which the invention may be applied advantageously being hereinbefore set forth. The preferred embodiment of the invention is shown in the accompanying drawings and will be hereinafter described in detail. It is to be understood, however, that the invention is not restricted to the particular construction shown, as equivalent constructions are contemplated and will be included within the scope of the claims.

The instrument, as shown in the present instance, comprises two measuring elements or components 1 and 2, the inlets of these respective measuring elements being connected to appropriate sources of the gases the respective rates of flow of which are to be measured and indicated by these elements or components of the instrument. For example, the inlets of these elements of the instrument may be connected respectively to tanks 4 and 5 which contain compressed charges of the respective gases, and valves are provided between the tanks and the respective elements of the instrument whereby the flow of the gases to the respective elements of the instrument may be regulated as desired or required. Preferably, valves 6 and 7 of the micrometer screw type are employed for this purpose whereby the pressures of the gases flowing from the tanks may be reduced to the desired working pressure without the necessity of employing diaphragm or other complicated pressure-reducing valves. Pipes 8 and 9 lead from the outlets of the respective measuring elements of the instrument, and these pipes join to a common outlet pipe 10 through which the gaseous mixture flows to the point of use.

The measuring elements or components of the instrument are preferably duplicates and they may be constructed of any suitable material, each comprising an outer tubular casing 11, preferably of glass or material which will permit inspection of its interior, an inner tube 12 of a diameter smaller than the outer casing 11 and preferably located concentrically therein, this inner tube being composed of any suitable material and preferably of glass or other transparent material, and a pair of end pieces or heads 13 and 14 are fitted tightly to the ends of the casing 11 and the inner tube 12 and secured in position by the screw rods 15 or other appropriate means. The end pieces or heads 13 and 14 both have fluid-tight fits upon the ends of the outer casing 11 and the inner tube 12. An inlet 16 leading from the respective micrometer screw-valve extends through the lower head 14 and into the lower end of the inner tube 12. The respective outlet pipe connects with an outlet 17 which extends through the upper head 13, the outlet in the present instance being shown leading from the upper end of the inner tube 12. This inner tube 12 is provided with a longitudinal slot 18 and the tube contains an indicator member 19 which fits closely within the tube 12 but is movable freely longitudinally therein. This indicator member carries a pointer 20 which extends through the slot 18 and coöperates with an appropriately graduated scale 21 located on the exterior of the tube 12. The indicator member acts in a manner similar to a piston. It has a tendency, by reason of its weight, to assume a position at the bottom of the tube 12 but the indicator member will be lifted by the pressure of gas entering the lower end of the tube 12 through the inlet 16, the gas acting on the under side of the indicator member and also escaping from the tube 12 through the portion of the slot 18 which is uncovered by and is beneath the indicator member. Obviously, the rising or falling of the indicator member in the tube 12 provides an outlet from the tube 12 which outlet is correspondingly increased or diminished in capacity to conform with variations in the rate of flow of the gas entering the lower end of the tube 12. In consequence, the indicator 20 on the member 19 will indicate directly on the scale 21 the rate of flow of the gas at any given moment, and by adjusting the valve which controls the flow of gas to the lower end of the tube 12, the indicator member 19 may be brought to the elevation corresponding to the rate of flow desired. It will be understood that, in employing two measuring and indicating elements, the regulating valves at the inlets thereof are adjusted to bring the respective indicators to the elevations or points corresponding to the respective rates of flow of the different gases to enable a mixture to be made which contains definite proportions of the component gases.

In order to facilitate the initial adjustment of the instrument and to also enable it to be easily and accurately standardized, means is provided to permit regulating or adjusting the width and in consequence the capacity of the slot 18 in each tube 12. Preferably, and as shown, the graduated indicating scale 21 is constructed in the form of a strip which is fitted against the outer side of the tube 12 and one of the edges of this strip is adapted to extend more or less over the slot 18, thereby reducing the width of the slot. Suitable means is provided for securing the scale strip 21 in position after it has been properly set, the scale strip in the present instance being shown provided with slots 22 to receive clamping screws 23. It will be understood that when the slot 18 is reduced in width by increasing the overlap of this slot by the adjustable strip, the capacity of the slot will be reduced and, in consequence, the indicator member will be lifted to a greater extent for a given rate of flow of the gas as compared with an adjustment of the strip whereby the width of the slot 18 is increased. By setting the adjustable strip to bring the indicator 20 to register properly with the scale while the rate of flow of the gas is being measured by another standard instrument, the scale strip may be readily and easily set to obtain accurate standardized readings.

Means is also provided to prevent tilting and consequent binding of the indicator member 19 in its movements vertically within the tube 12, it being desirable that this indicator member move with the greatest freedom within the tube 12 to enable the greatest degree of accuracy to be obtained in the readings. As shown, the lower end of the member 19 is weighted by a ring 24 which brings the center of mass of the indicator member relatively low, in consequence of which tilting and binding of the indicator member against the walls of the tube 12 are avoided.

I claim as my invention:

1. An instrument for measuring and indicating the rate of flow of a gas comprising a tubular member adapted to receive the gas to be measured at one end thereof and having a longitudinally extending slot in its wall, an indicator member movable longitudinally in said tubular member under the influence of the gas therein to vary the size of opening provided by said slot in accordance with the rate of flow of the gas, a pointer connected to said indicator member and extending through said slot to the outer side of the tubular member, and a graduated scale adjustably mounted on the outer side of the tubular member to vary the width of the slot of the latter and adapted to coöperate with said pointer.

2. An instrument for measuring and indicating the rate of flow of a gas comprising a vertical tube adapted to receive the gas to be measured at its lower end and having a longitudinal slot in its side wall, a hollow body with an open bottom and closed top fitting and freely movable vertically in the tube to uncover more or less of the slot therein according to the rate of flow of the gas, a scale attached to the exterior wall of the tube, and a pointer connected to said body and extending through said slot to the exterior of the tube to coöperate with the scale.

3. An instrument for measuring and indicating the rate of flow of gases comprising a tube adapted to receive at one end the gas to be measured and having a longitudinal slot in its side wall for the outflow of gas from the tube, a hollow body with an open bottom and closed top freely movable longitudinally within the tube to uncover more or less of said slot according to the rate of flow of the gas entering the tube, and means for varying the width of said slot.

4. An instrument for measuring and indicating the rate of flow of gases comprising a tube adapted to receive at one end the gas to be measured and having a longitudinal slot in its side wall for the outflow of gas from the tube, a hollow body having an open bottom and closed top and fitting and freely movable longitudinally within the tube to uncover more or less of the length of said slot according to the rate of flow of the gas entering the tube, a pointer connected to said body and extending outwardly through said slot in the tube, and a scale strip to coöperate with said pointer, said scale strip being adjustable to vary the effective width of said slot.

5. An instrument for measuring and indicating the rate of flow of gases comprising a vertical tube connected to receive at one end the gas to be measured and having a longitudinal slot in its side wall for the outflow of such gas from the tube, and a hollow body having an open bottom and closed top and freely movable vertically within the tube to uncover more or less of the length of the slot therein according to the rate of flow of the gas entering the tube, said body being weighted at its lower end to prevent tilting or binding thereof against the wall of the tube.

In testimony whereof I have hereunto set my hand in presence of two subscribing witnesses.

DAVID LAMBERT.

Witnesses:
　JOHN LYNCH,
　AUGUST ULM.